United States Patent
Eberling et al.

(10) Patent No.: US 8,909,449 B2
(45) Date of Patent: Dec. 9, 2014

(54) SYSTEM, CONTROLLER AND METHOD FOR PREVENTING VEHICLE ROLLAWAY

(71) Applicant: Bendix Commercial Vehicle Systems LLC, Elyria, OH (US)

(72) Inventors: Charles E. Eberling, Wellington, OH (US); Ronald S. Plantan, Mooresville, NC (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 64 days.

(21) Appl. No.: 13/686,215

(22) Filed: Nov. 27, 2012

(65) Prior Publication Data

US 2014/0149011 A1    May 29, 2014

(51) Int. Cl.
*B60T 7/12* (2006.01)
*B60T 8/17* (2006.01)

(52) U.S. Cl.
CPC .............. *B60T 7/122* (2013.01); *B60T 8/1708* (2013.01); *B60T 2201/06* (2013.01)
USPC ............ 701/70; 303/121; 303/127; 303/191; 303/192; 303/198

(58) Field of Classification Search
CPC ............................ B60T 8/1887; B60T 15/043
See application file for complete search history.

(56) References Cited

U.S. PATENT DOCUMENTS

| | | | |
|---|---|---|---|
| 5,580,136 A | 12/1996 | Hanschek | |
| 5,984,429 A | 11/1999 | Nell | |
| 6,079,312 A | 6/2000 | Plantan | |
| 6,086,515 A | 7/2000 | Buschmann | |
| 6,260,934 B1 | 7/2001 | Lee | |
| 6,264,291 B1 | 7/2001 | Eberling | |
| 6,411,879 B2 | 6/2002 | Kupper | |
| 6,439,675 B1 | 8/2002 | Zechmann | |
| 6,547,344 B2 | 4/2003 | Hada | |
| 6,631,960 B2 | 10/2003 | Grand | |
| 6,679,810 B1 | 1/2004 | Boll | |
| 6,875,153 B2 | 4/2005 | Jager | |
| 7,226,389 B2 | 6/2007 | Steen | |
| 7,444,221 B2 | 10/2008 | Yamada | |
| 7,464,996 B2 * | 12/2008 | Saewe et al. | 303/89 |
| 7,507,182 B2 | 3/2009 | Matsumura | |
| 7,516,007 B2 | 4/2009 | Tamai | |
| 8,182,050 B2 * | 5/2012 | Jackson et al. | 303/192 |
| 2005/0140208 A1 | 6/2005 | Ji | |
| 2005/0143877 A1 | 6/2005 | Cikanek | |

(Continued)

FOREIGN PATENT DOCUMENTS

EP 523338 A2 5/2002
EP 2033867 A2 9/2008

*Primary Examiner* — John R Olszewski
*Assistant Examiner* — Todd Melton
(74) *Attorney, Agent, or Firm* — Eugene E. Clair; Cheryl L. Greenly; Brian E. Kondas

(57) ABSTRACT

Various embodiments of a controller, system and method of preventing vehicle rollaway for a heavy vehicle are disclosed. The controller receives a service brake signal indicating an operator has engaged the service brakes, a parking brake signal indicating the operator intent to actuate the parking brake and a signal indicative of motion. The controller transmits a control signal to at least two braking system components in response the service brake signal, the parking brake signal, and the motion of the vehicle to maintain engagement of the vehicle service brakes after the service brake pressure signal begins to decrease.

32 Claims, 4 Drawing Sheets

(56) References Cited

U.S. PATENT DOCUMENTS

| | | |
|---|---|---|
| 2006/0186731 A1* | 8/2006 | Bach ............................. 303/89 |
| 2006/0284482 A1 | 12/2006 | Yang |
| 2007/0052290 A1 | 3/2007 | Hwang |
| 2008/0190680 A1 | 8/2008 | Kaneko |
| 2010/0017085 A1 | 1/2010 | Woywod |
| 2010/0292902 A1 | 11/2010 | Bach |
| 2010/0327653 A1* | 12/2010 | Wygnanski et al. ............ 303/10 |
| 2012/0161508 A1* | 6/2012 | Beever et al. ................. 303/191 |

\* cited by examiner

SYSTEM, CONTROLLER AND METHOD FOR PREVENTING VEHICLE ROLLAWAY

BACKGROUND

The present invention relates to embodiments of a system, controller and method for preventing vehicle rollaway on a commercial vehicle equipped with an air brake system. Vehicle rollaway may occur during the time period when the vehicle is transitioning from a service brake application by the driver to a parking brake application. Commercial vehicles equipped with air brake systems may begin to roll during the transition time from the initiation of a parking brake application until the parking brakes are fully engaged if the driver removes or reduces the service brake application during the transition time. Rollaway is more pronounced if the vehicle is on a grade and/or carrying a heavy load. Preventing vehicle rollaway is desirable.

SUMMARY

Various embodiments of a controller for preventing vehicle rollaway in accordance with the invention are disclosed. The controller comprises an input for receiving a service brake pressure signal, an input for receiving a parking brake signal and an output for transmitting a control signal. The controller includes control logic that receives the service brake pressure signal indicating the operator has engaged the vehicle service brakes and the parking brake signal indicating an operator's intent to park the vehicle. The controller then transmits the control signal to maintain the engagement of the vehicle service brakes when the service brake pressure signal indicates a reduction in the service brake pressure.

Various methods for preventing vehicle rollaway in accordance with the invention are disclosed. One method includes receiving a service brake signal and a parking brake signal. The method further comprises transmitting a control signal for a predetermined time period to maintain the engagement of the vehicle service brakes after the service brake signal indicates a reduction in the service brake pressure and the parking brake signal indicates the operator's intent to park the vehicle.

Various embodiments of systems for preventing rollaway accordance with the invention are disclosed. In one system, there are at least two braking system components, a vehicle motion sensor and a controller. The controller includes an input for receiving a service brake signal, an input for receiving a signal indicative of vehicle motion, an input for receiving a parking brake signal, an input for receiving a load signal indicative of a load of the vehicle, an input for receiving a gradient signal indicative of the grade of the vehicle, an output for transmitting a control signal to the at least two braking system components and control logic. The control logic receives the service brake signal indicating an operator has engaged the service brakes and receives the parking brake signal indicating the operator intent to actuate the parking brake. The control logic also receives the signal indicative of vehicle motion and determines the signal indicative of vehicle motion is less than or equal to a predetermined threshold value. Then the control logic transmits a control signal to the at least two braking system components to maintain engagement of the vehicle service brakes for a first predetermined period when the service brake signal indicates a reduction in the service brake pressure and the parking brake signal indicates the operator's intent to park the vehicle.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
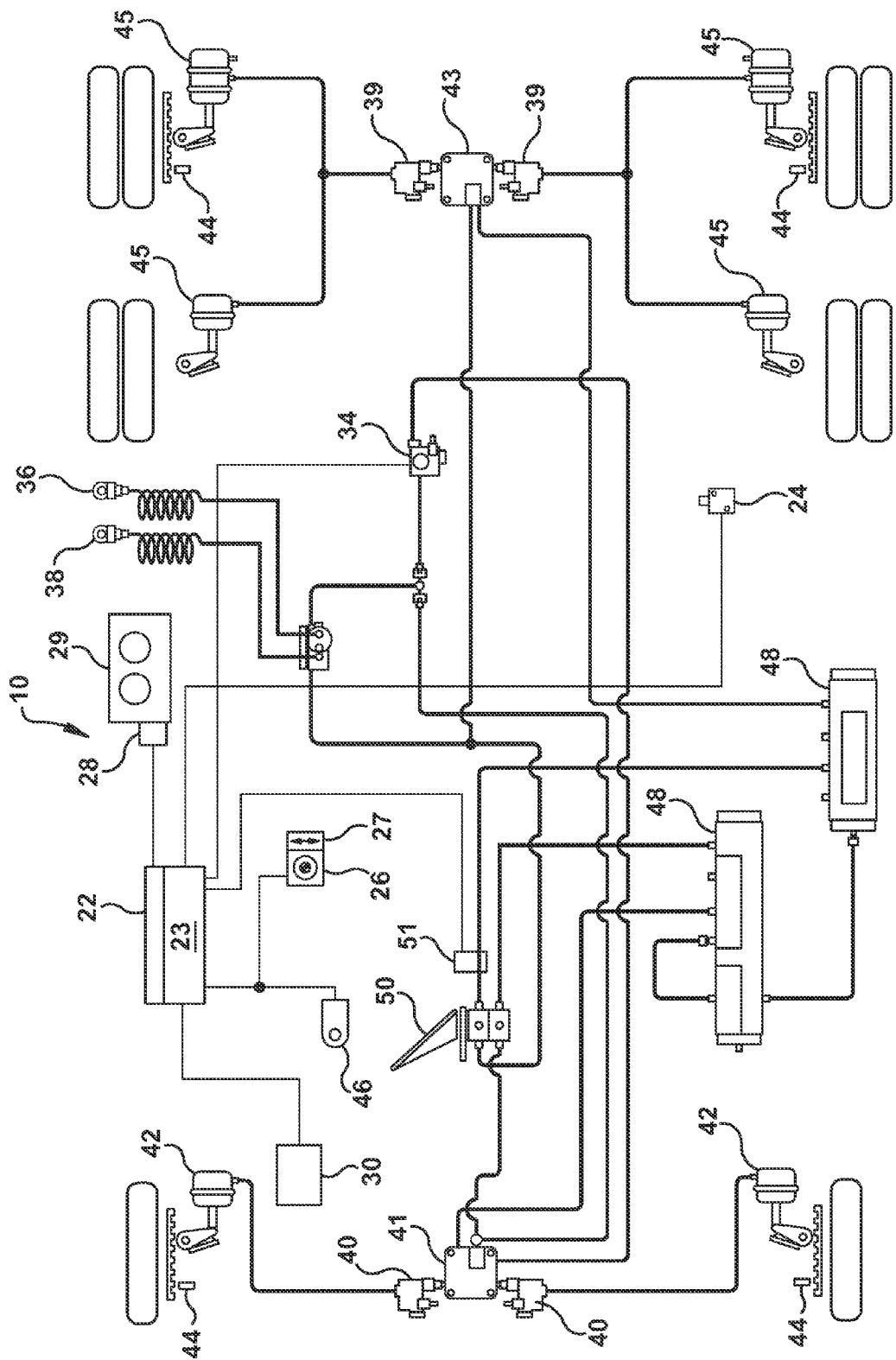
FIG. 1 illustrates a schematic representation of an air brake system, including a vehicle controller, according to an embodiment of the present invention.

With reference to FIG. 1, a towing vehicle, or tractor, air brake system 10 is shown. The system 10 includes an electronic vehicle controller 22 with inputs for electrically connecting to, either directly or through a vehicle serial communication bus, two front modulators 40 and at least two rear modulators 39, at least four wheel speed sensors 44, a front traction relay valve 41, a rear traction relay valve 43, a trailer pressure control device 34, a steering angle sensor 46, a lateral acceleration sensor 27, a yaw rate sensor 26, a parking brake switch 28, at least one service brake application monitoring device 51, a gradient sensor 30 and a load sensor 24. The pneumatic portion of the tractor air brake system 10 includes two front brake actuators 42, at least two rear brake actuators 45, at least two reservoirs 48, and an operator actuated brake pedal 50. Each of the at least four wheel speed sensors 44 communicates the individual wheel speeds to the vehicle controller 22 for use in antilock braking system (ABS), automatic slip regulation (ASR), and electronic stability control (ESC) algorithms. Each of the two front modulators 40 is connected pneumatically to front traction relay valve 41 and to one of the two front brake actuators 42. Each of the rear modulators 39 is connected pneumatically to rear traction relay valve 43 and to one of the at least two rear brake actuators 45. When equipped with ESC, the controller 22 is capable of actuating the tractor brakes independently of the operator in order to maintain vehicle stability. The system 10 can also be used on a straight truck that does not tow a trailer. The complete parking brake system is not illustrated in FIG. 1.

The controller 22 includes a processing and memory unit, which may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the processing unit. The processing and memory unit includes the control logic 23.

The control logic 23 receives a service brake pressure signal. The service brake pressure signal may be received from the service brake application monitoring device 51, which can be a sensor or switch affixed or pneumatically connected to the brake pedal valve 50. When the service brake pressure signal is received, the control logic 23 determines that the operator has engaged the service brakes via the brake pedal valve 50. During a service brake application, pressurized air is passed from the reservoir 48, through the applied brake pedal valve 50, through the traction relay valves 41, 43 and through the modulators 39, 40. The pressurized air passes through the modulators 39, 40 to the brake actuators 42, 45 in order to stop the vehicle in response to the driver applying the brake pedal valve 50. The controller 22 does not intervene with an operator's engagement of the service brake application unless an ABS, ESP or ATC or the present inventive algorithm requests an intervention with the service brake system.

The control logic 23 receives a signal indicative of the driver's intent to park the vehicle from a parking brake switch 28 affixed to or pneumatically connected to a parking brake valve 29. The vehicle operator will pull a button on the parking brake valve 29, for example a MV-3® control valve from Bendix Commercial Vehicle Systems LLC, when he wants to park the vehicle. Once the operator pulls the button on the parking brake valve 29 he will generally take his foot off the service brake pedal 50, such that the service brake pressure signal is reduced or ceases to be transmitted from the service brake monitoring device 51. It is also contemplated that the parking brake function can be completed electronically and the parking brake switch 28 monitors the electronic actuation of the parking brake system.

The vehicle controller 22 receives a signal indicative of the combined load of the tractor and the coupled trailer from the load sensor 24. In one embodiment, the load sensor 24 is a pressure sensor connected to a tractor air suspension air bag. As the pressure in the air bag increases, the load signal value indicative of the combined load increases and, therefore, the load as determined by the vehicle controller 22 from the load signal increases. Other means may be used to determine the tractor-trailer load, such as on board scales, linear displacement sensors on the tractor chassis or vehicle mass estimation based on engine torque data. It is understood that the signal indicative of the tractor-trailer load may be received either directly through a controller input or through a vehicle serial communications bus.

The vehicle controller 22 receives a signal indicative of the gradient on which the vehicle is located from a gradient sensor 30. In one embodiment, the gradient sensor 30 is an inclinometer located on the vehicle at a location to measure actual vehicle gradient with respect to level ground. It is understood that the signal indicative of the gradient may be received either directly through a controller input or through a vehicle serial communications bus from another controller, such as the vehicle transmission for example.

The control logic 23 receives a signal indicative of vehicle motion. In one embodiment, the vehicle motion is determined from the vehicle speed. The vehicle speed is determined from individual wheel speed sensors 44 or from another source, such as the engine. In another embodiment, the vehicle motion may be determined from a global positioning system (GPS), the motion of the vehicle drive shaft or a vehicle mounted sensor monitoring the roadway. The control logic 23 is capable of comparing the vehicle motion determined from at least one source on the vehicle to a predetermined threshold value.

The vehicle controller 22 includes at least one output for transmitting a control signal to the braking system components, shown as modulators 39, 40 in FIG. 1. The service brake components are controlled individually such that the front modulators 40 can be actuated independently of the rear modulators 39. The modulators 39, 40 are a type of electro-pneumatic braking system components. Braking system components are capable of receiving the control signal from the controller 22 and communicating pressurized air to the brake actuators 42, 45 in response to the control signal. Other types of braking system components include electronic foot valves, proportional modulators, three-way relay valves, pneumatic biasing valves and electro-pneumatic devices.

Accordingly, a controller for a vehicle braking system comprising an input for receiving a service brake pressure signal indicative of an application of service brake, an input for receiving a parking brake signal, an output for transmitting a control signal and control logic is disclosed. The control logic receives the service brake pressure signal indicating the operator has engaged the vehicle service brakes and the parking brake signal indicating an operator's intent to park the vehicle and transmits the control signal to the output to maintain the engagement of the vehicle service brakes when the service brake signal indicates a reduction in the service brake pressure.

Accordingly, a system for preventing vehicle rollaway is disclosed. The system comprises at least two braking system components, a vehicle motion detector, and a controller. The controller comprises an input for receiving a service brake signal, an input for receiving a signal indicative of vehicle motion, an input for receiving a parking brake signal, an output for transmitting a control signal to the at least two braking system components and control logic. The control logic receives the service brake signal indicating an operator has engaged the service brakes, receives the parking brake signal indicating the operator intent to actuate the parking brake, receives the signal indicative of vehicle motion; and transmits a control signal to the at least two braking system components to maintain engagement of the vehicle service brakes in response to the service brake signal indicating a reduction in the service brake pressure, the parking brake signal indicating the operator intends to actuate the parking brake and the vehicle motion signal indicates the vehicle motion is less than or equal to a predetermined threshold value.

Figure 2:
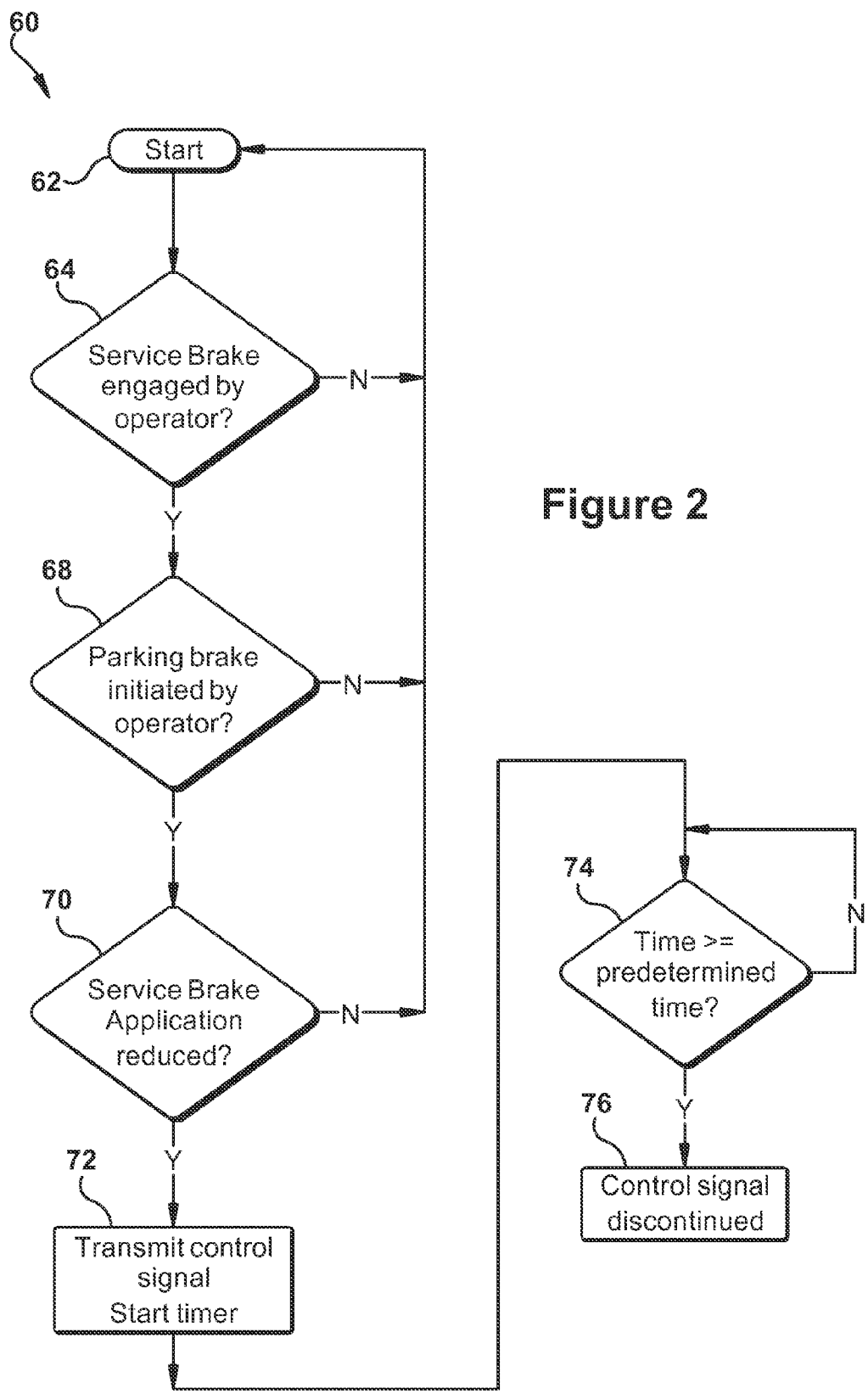
FIG. 2 illustrates a flowchart that describes a method of implementing the vehicle brake control, according to an embodiment of the present invention.

A flowchart for implementing an algorithm 60 of the present invention is shown in FIG. 2. The algorithm begins at step 62. In step 64, a determination is made by the control logic 23 whether the service brake has been engaged by the vehicle operator. The control logic receives the service brake pressure signal from the service brake application monitoring device 51. If the operator has engaged the service brakes, the algorithm continues to step 68. If not, the algorithm returns to step 62.

In step 68, the control logic determines if the vehicle operator has initiated a parking brake application. The operator's initiation of a parking brake application can be determined through the signal generated by the parking valve switch 28 or other means. If the parking brake application is initiated, the algorithm proceeds to step 70. If the parking brake application is not initiated, the algorithm returns to step 62.

In step 70, the service brake signal from the service brake application device 51 is monitored to determine if the vehicle operator has released the service brake, i.e. taken his foot off the brake pedal 50. If the operator has removed his foot from the brake pedal 50, the service brake pressure signal begins to reduce and the algorithm proceeds to step 72. If the operator continues to have his foot on the brake pedal 50 such that the service brakes remain engaged by the operator, the algorithm returns to step 62.

In step 72, the control logic 23 sends a control signal to the braking system components, e.g. modulators 39, 40, to enter a hold state. In a hold state, the modulators 39, 40 retain the pressurized air that was delivered to the brake actuators 42, 45 during the operator's service brake application at the brake actuators 42, 45 regardless of whether the operator is stepping on the brake pedal 50 to request a service brake application. In one embodiment, the control signal is transmitted only to the front axle modulators 40. In another embodiment, the control signal is transmitted to all modulators 39, 40. A timer is started in step 72. The algorithm proceeds to step 74.

In step 74, the timer value is compared to a predetermined time period. The predetermined time period is selected at least partially based on the time it takes for the parking brakes to be fully engaged after the vehicle operator requests a parking brake actuation. In one embodiment, the predetermined time period can range from about 500 milliseconds to about 3 seconds. In another embodiment, the predetermined time period is about one second. If the timer value is less than the predetermined time period, the algorithm remains at step 74. If the timer value is equal to or greater than the predetermined time period, the algorithm proceeds to step 76.

In step 76, the control signal is discontinued. When the control signal is discontinued as in step 76, the modulators 39, 40 exhaust the pressurized air the modulators 39, 40 have been holding such that there is no service brake application at the actuators 42, 45. The modulators 39, 40 exhaust the pressurized air to atmosphere in response to the control signal. This method prevents vehicle rollaway by maintaining the engagement of the service brakes for a predetermined time period until the parking brakes are fully engaged.

Figure 3:
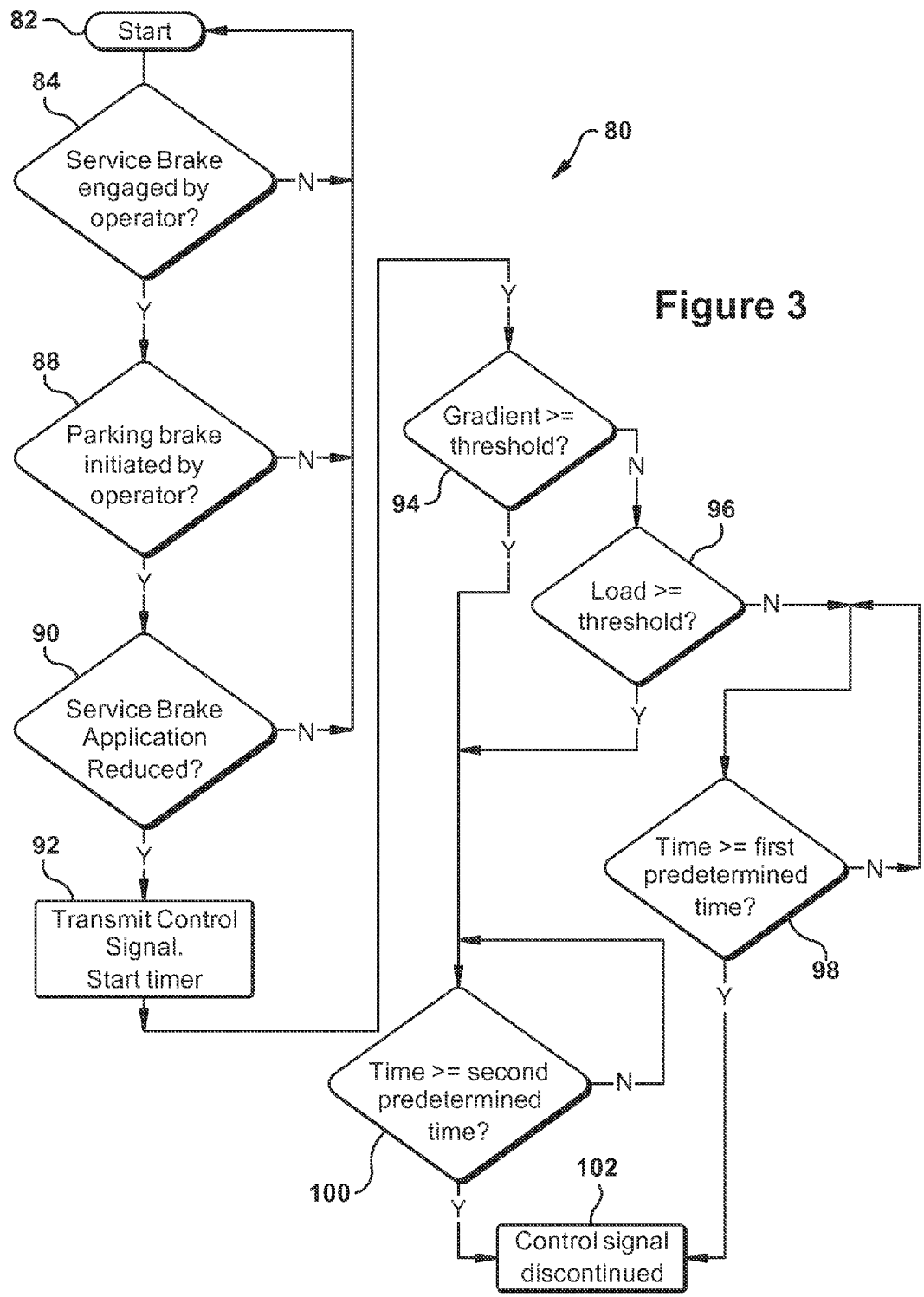
FIG. 3 illustrates a flowchart that describes another method of implementing vehicle brake control, according to an embodiment of the present invention.

FIG. 3 depicts a flowchart of an algorithm 80 showing another embodiment of the present invention. The algorithm 80 of this alternate embodiment begins at step 82.

In step 84, a determination is made whether the service brake has been engaged by the vehicle operator. The control logic receives the service brake pressure signal from the service brake application monitoring device 51. If the operator has engaged the service brakes, the algorithm continues to step 88. If not, the algorithm returns to step 82.

In step 88, the controller determines if the vehicle operator has initiated a parking brake application. The operator's initiation of a parking brake application can be determined through the signal generated by the parking valve switch 28 or other means. If the parking brake application is initiated, the algorithm proceeds to step 90. If the parking brake application is not initiated, the algorithm returns to step 82.

In step 90, the service brake signal from the service brake application device 51 is monitored to determine if the vehicle operator has released the service brake, i.e. taken his foot off the brake pedal 50. If the operator has removed his foot from the brake pedal 50, the service brake pressure begins to reduce and the algorithm proceeds to step 92. If the operator continues to have his foot on the brake pedal 50 such that the service brakes remain engaged by the operator, the algorithm returns to step 82.

In step 92, the control logic 23 sends a control signal to the braking system components, e.g. modulators 39, 40, to enter a hold state. In a hold state, the modulators 39, 40 retain the compressed air that was delivered to the brake actuators 42, 45 during the operator's service brake application at the brake actuators 42, 45 regardless of whether the operator is stepping on the brake pedal 50 to request a service brake application. In one embodiment, the control signal is transmitted only to the front axle modulators 40. In another embodiment, the control signal is transmitted to all modulators 39, 40. A timer is started in step 92. The algorithm proceeds to step 94.

In step 94, the control logic 23 receives a signal indicative of the gradient on which the vehicle is parked from the gradient sensor 30. The control logic compares the gradient to a predetermined gradient threshold value. In one embodiment, the predetermined gradient threshold value is a gradient less than about 20%. In another embodiment, the predetermined gradient threshold value is a gradient ranging from about 5% to about 10%. If the gradient is less than the predetermined gradient threshold value, the algorithm proceeds to step 96.

In step 96, the vehicle load from the load sensor 24 is compared to a predetermined vehicle load threshold value. Different heavy vehicles are capable of carrying a wide range of loads based on axle capacity rating, etc. The predetermined load threshold value could be set for each different heavy vehicle. In one embodiment, the predetermined load threshold value is a weight that ranges from about one-half of the total rated load for the entire vehicle to about a full load for the given vehicle. In another embodiment, the predetermined load threshold value is from about 75% to the full load for the given vehicle. If the load is less than the predetermined load threshold value, the algorithm proceeds to step 98.

In step 98, the timer value is compared to a first predetermined time period in one embodiment, the first predetermined time period can range from about 500 milliseconds to about 3 seconds. In another embodiment, the first predetermined time period is about one second. If the timer value is less than the first predetermined time, the algorithm remains at step 98. If the timer value is equal to or greater than the first predetermined time period, the algorithm proceeds to step 102.

If the vehicle gradient is greater than or equal to the predetermined gradient threshold value in step 94, the algorithm proceeds to step 100. In step 100, the timer value as in step 92 is compared to a second predetermined time period. In one embodiment, the second predetermined time period can range from about 500 milliseconds to about five seconds. In another embodiment, the second predetermined time period is from about one second to about three seconds. In another embodiment, the second predetermined time period is greater than the first predetermined time period. If the timer value is less than the second predetermined time period, the algorithm remains at step 100. If the timer value is equal to or greater than the second predetermined time period, the algorithm proceeds to step 102.

If the vehicle load is greater than or equal to the predetermined load threshold value in step 96, the algorithm proceeds to step 100. In step 100, the timer value as in step 92 is compared to a second predetermined time period. In one embodiment, the second predetermined time period can range from about 500 milliseconds to about five seconds. In another embodiment, the second predetermined time period is from about one second to about three seconds. In another embodiment, the second predetermined time period is greater than the first predetermined time period. If the timer value is less than the second predetermined time period, the algorithm remains at step 100. If the timer value is equal to or greater than the second predetermined time period, the algorithm proceeds to step 102.

In step 102, the control signal is discontinued. When the control signal is discontinued as in step 102, the modulators 39, 40 exhaust the pressurized air they have been holding such that there is no service brake application at the actuators 42, 45. This method prevents vehicle rollaway during the time when the vehicle parking brakes are being engaged. A longer time period for holding pressurized air is provided if the vehicle load is greater than a threshold load or the gradient on which the vehicle is located is greater than a predetermined gradient as the vehicle has a greater tendency for rollaway during either of those conditions. This alternate method prevents vehicle rollaway by maintaining the engagement of the service brakes for a predetermined time period until the parking brakes are fully engaged.

Figure 4:
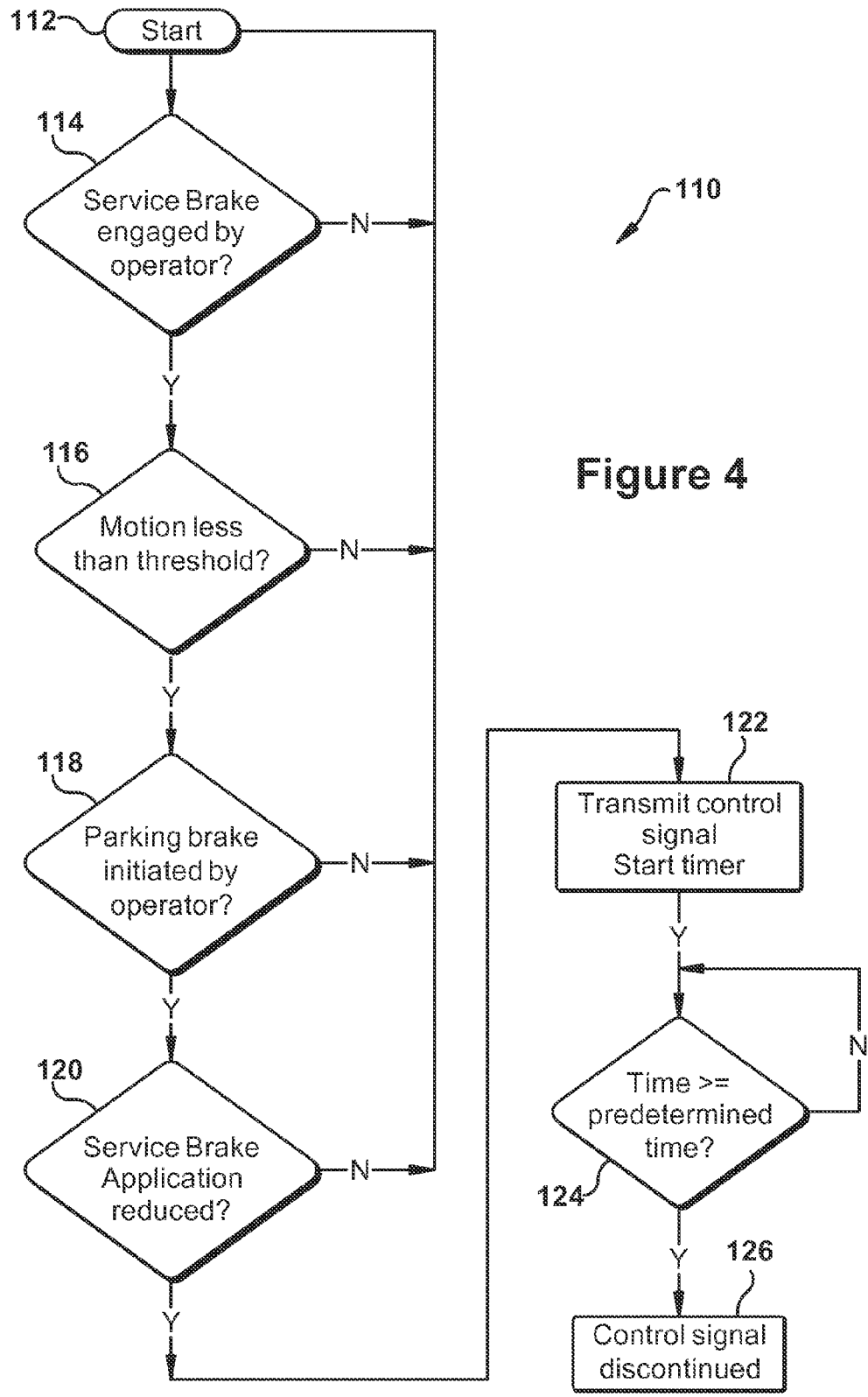
FIG. 4 illustrates a flowchart that describes another method of implementing vehicle brake control, according to an embodiment of the present invention.

FIG. 4 depicts a flowchart of an algorithm 110 showing another embodiment of the present invention. The algorithm of this alternate embodiment begins at step 112. In step 114, a determination is made by the control logic 23 whether the service brake has been engaged by the vehicle operator. The control logic receives the service brake pressure signal from the service brake application monitoring device 51. If the operator has engaged the service brakes, the algorithm continues to step 116. If not, the algorithm returns to step 112.

In step 116, the vehicle motion is compared to a predetermined threshold value. In an embodiment where the vehicle motion is determined using vehicle speed, the predetermined threshold value is less than about 10 miles per hour. In another embodiment, the predetermined threshold value is from about three miles per hour to about five miles per hour. If the vehicle speed is less than the predetermined threshold value, the algorithm continues to step 118. If the vehicle speed is greater than or equal to the threshold value, the algorithm returns to step 112. Other threshold values can be set based on means of determining vehicle motion.

In step 118, the control logic determines if the vehicle operator has initiated a parking brake application. The operator's initiation of a parking brake application can be determined through the signal generated by the parking valve switch 28 or other means. If the parking brake application is initiated, the algorithm proceeds to step 70. If the parking brake application is not initiated, the algorithm returns to step 62.

In step 120, the service brake pressure signal from the service brake application device 51 is monitored to determine if the vehicle operator has released the service brake, i.e. taken his foot off the brake pedal 50. If the operator has removed his foot from the brake pedal 50, the service brake pressure signal begins to reduce and the algorithm proceeds to step 122. If the operator continues to have his foot on the brake pedal 50 such that the service brakes remain engaged by the operator, the algorithm returns to step 112.

In step 122, the control logic 23 sends a control signal to the braking system components, e.g. modulators 39, 40, to enter a hold state. In a hold state, the modulators 39, 40 keep the pressurized air that was delivered to the brake actuators 42, 45 during the operator's service brake application applied to the brake actuators 42, 45 regardless of whether the driver is stepping on the brake pedal 50 to request a service brake application. In one embodiment, the control signal is transmitted only to the front axle modulators 40. In another embodiment, the control signal is transmitted to all modulators 39, 40. A timer is started in step 122. The algorithm proceeds to step 74.

In step 124, the timer value is compared to a predetermined time period. The predetermined time period is selected at least partially based on the time it takes for the parking brakes to be fully engaged after the vehicle operator requests a parking brake actuation. In one embodiment, the predetermined time period can range from about 500 milliseconds to about 3 seconds. In another embodiment, the predetermined time period is about one second. If the timer value is less than the predetermined time period, the algorithm remains at step 122. If the timer value is equal to or greater than the predetermined time period, the algorithm proceeds to step 126.

In another embodiment, the vehicle motion is monitored during all of the steps of algorithm. If the vehicle motion is determined to be greater than or equal to the threshold value, the algorithm proceeds directly to step 126.

In step 126, the control signal is discontinued. When the control signal is discontinued as in step 126, the modulators 39, 40 exhaust the pressurized air the modulators 39, 40 have been holding such that there is no service brake application at the actuators 42, 45. The modulators 39, 40 exhaust the pressurized air to atmosphere in response to the control signal. This method prevents vehicle rollaway by maintaining the engagement of the service brakes for a predetermined time period until the parking brakes are fully engaged.

Accordingly, a method for preventing vehicle rollaway comprises receiving a service brake pressure signal indicating an operator has engaged the vehicle service brakes, receiving a parking brake signal indicating the operator's intent to park the vehicle and transmitting a control signal to maintain the engagement of the vehicle service brakes in response to the parking brake signal and the service brake signal indicating a reduction in the service brake pressure.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A controller for a vehicle braking system comprising: an input for receiving a service brake pressure signal; an input for receiving a parking brake signal; an output for transmitting a control signal to at least one associated braking system component; and control logic, wherein the control logic: receives the service brake pressure signal indicating the operator has engaged the vehicle service brakes and the parking brake signal indicating an operator's intent to park the vehicle; and transmits the control signal to the output to maintain engagement of the service brakes in response to the service brake pressure signal indicating a reduction in the service brake pressure.

2. The controller as in claim 1, further comprising an input for receiving a signal indicative of vehicle motion, wherein the signal is greater than or equal to a threshold value and the control logic does not transmit the control signal to the output.

3. The controller as in claim 2, wherein the signal indicative of vehicle motion is indicative of wheel speed.

4. The controller as in claim 3, wherein the signal indicative of wheel speed indicates the wheel speed is less than about five miles per hour.

5. The controller as in claim 1, wherein the control signal is transmitted to at least one associated electro-pneumatic braking system component to maintain the engagement of vehicle service brakes.

6. A controller as in claim 1, wherein a timer is initiated when the control logic begins transmitting the control signal and the timer value is compared to a first predetermined time period.

7. The controller as in claim 6 wherein the timer value is greater than or equal to the first predetermined time period and the control logic discontinues the control signal.

8. The controller as in claim 7 wherein the first predetermined time period is less than three seconds.

9. The controller as in claim 6 wherein the controller further comprises an input for receiving a signal indicative of a vehicle gradient and the control logic further receives the vehicle gradient signal, determines the vehicle gradient is greater or equal to than a predetermined gradient threshold value and transmits the control signal until the timer value is greater than or equal to a second predetermined time period.

10. The controller as in claim 9 wherein the second predetermined time period is greater than the first predetermined time period.

11. The controller as in claim 10 wherein the second predetermined time period is from about one second to about three seconds.

12. The controller as in claim 6 wherein the controller further comprises an input for receiving a signal indicative of vehicle load and the control logic further receives the load signal, determines the load signal is greater than or equal to a predetermined threshold load value and transmits the control signal until the timer value is greater than or equal to a second predetermined time period.

13. The controller as in claim 12 wherein the second predetermined time period is greater than the first predetermined time period.

14. The controller as in claim 13 wherein the second predetermined time period is from about one second to about three seconds.

15. A controller for a vehicle braking system comprising: an input for receiving a service brake pressure signal indicative of an operator application of the vehicle service brakes; an input for receiving a signal indicative of vehicle speed; an input for receiving a parking brake signal; an output for transmitting a control signal to at least one associated brake system component; and control logic, wherein the control logic: receives a service brake signal indicating the operator has engaged the vehicle service brakes, a parking brake signal indicating an operator's intent to park the vehicle, and a signal indicative of vehicle speed; determines the signal indicative of vehicle speed is less than or equal to a predetermined threshold speed value; and transmits the control signal to the output to maintain the engagement of the vehicle service brakes in response to the service brake pressure signal indicating a reduction in the service brake pressure.

16. A method for preventing vehicle rollaway comprising: receiving a service brake pressure signal indicating an operator has engaged the vehicle service brakes; receiving a parking brake signal indicating the operator's intent to park the vehicle; transmitting a control signal to maintain the engagement of the vehicle service brakes in response to the parking brake signal and the service brake pressure signal indicating a reduction in the service brake pressure; initiating a timer; and continuing to transmit the control signal until the timer value is greater than or equal to a first predetermined time period.

17. The method as in claim 16 further comprising receiving a signal indicative of vehicle motion, wherein the signal indicates the vehicle motion is greater than or equal to a threshold value and discontinuing the transmission of the control signal.

18. The method as in claim 16 wherein the signal indicative of vehicle motion is indicative of wheel speed.

19. The method as in claim 16, wherein transmitting the control signal to maintain the engagement of the vehicle service brakes comprises retaining pressurized air at a braking system component in response to the control signal.

20. The method as in claim 19, further comprising releasing the pressurized air at the braking system component to atmosphere in response to the timer value being greater than or equal to the first predetermined time period.

21. The method as in claim 16 wherein the first predetermined time period is from about 500 milliseconds to about three seconds.

22. The method as in claim 16 further comprising: receiving a gradient signal indicative of a vehicle gradient; determining the gradient signal is greater than or equal to a predetermined threshold gradient value; transmitting the control signal to maintain engagement of the vehicle service brakes until the timer value is greater than or equal to a second predetermined time period, the second predetermined time period being greater than the first predetermined time period.

23. The method as in claim 16 further comprising: receiving a load signal indicative of a vehicle load; determining the load signal is greater than a predetermined threshold load value; transmitting the control signal to maintain engagement of the vehicle service brakes until the timer value is greater than or equal to a second predetermined time period, the second predetermined time period being greater than the first predetermined time period.

24. A system for preventing vehicle rollaway comprising: at least two braking system components; a vehicle motion detector; a controller, the controller comprising: an input for receiving a service brake pressure signal; an input for receiving a signal indicative of vehicle motion; an input for receiving a parking brake signal; an output for transmitting a control signal to the at least two braking system components; and control logic wherein the control logic receives the service brake pressure signal indicating an operator has engaged the service brakes; receives the parking brake signal indicating the operator intent to park the vehicle; receives the signal indicative of vehicle motion; and transmits a control signal to the at least two braking system components to maintain engagement of the vehicle service brakes in response to the service brake signal indicating a reduction in the service brake pressure, the parking brake signal indicating the operator intends to park the vehicle and the vehicle motion signal indicating the vehicle motion is less than a predetermined threshold value.

25. The system as in claim 24 wherein the vehicle motion detector is at least one of a wheel speed sensor, a GPS unit and a drive shaft sensor.

26. The system as in claim 24 wherein the at least two braking system components receive compressed air in response to the service brake signal indicating the operator has engaged the service brakes.

27. The system as in claim 26 wherein the at least two braking system components are two modulators located on a front axle of the vehicle.

28. The system as in claim 24 wherein the at least two braking system components maintain engagement of the vehicle service brakes by holding pressurized air in response to the control signal.

29. The system as in claim 28 wherein the control signal is discontinued and the pressurized air at the at least two braking system components is released to atmosphere.

30. The system as in claim 24 wherein the control logic initiates a timer and continues to transmit the control signal until the timer value is equal to or greater than a first predetermined time period.

31. The system as in claim 30 wherein the first predetermined time period is from about 500 milliseconds to about three seconds.

32. The system as in claim 30 further comprising: an input for receiving a load signal indicative of a load of the vehicle; an input for receiving a gradient signal indicative of the grade of the vehicle; and the control logic transmitting the output signal to the at least two braking system components in response to at least one of the gradient signal being greater than or equal to the gradient threshold value and the vehicle load signal being greater than or equal to the load threshold value and the timer value being less than a second predetermined time period, the second predetermined time period being greater than the first predetermined time period.

* * * * *